UNITED STATES PATENT OFFICE 2,134,038

MONOAZO DYESTUFFS

Richard Fleischhauer, Frankfort-on-the-Main-Fechenheim, Germany, assignor to General Aniline Works, Inc., New York, N. Y., a corporation of Delaware No Drawing. Application October 16, 1936, Serial No. 105,931. In Germany October 22, 1935

3 Claims. (Cl. 260—92)

This invention relates to valuable new monoazodyestuffs, more particularly to those of the general formula:

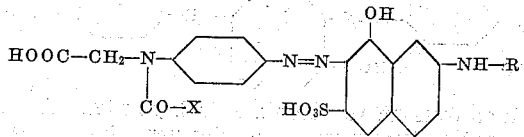

wherein X stands for a member selected from the group consisting of hydrogen, alkyl, alkoxy, cyclohexyl and phenyl and R stands for a monocyclic radicle of the benzene series.

The new dyestuffs are obtained by combining the diazo compounds of aromatic amines of the general formula:

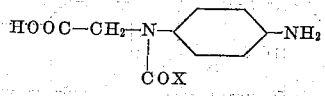

(wherein X has the above signification) with 2-aryl-amino-8-naphthol-6-sulfonic acids.

The diazo components employed for the manufacture of the dyestuffs of this invention may be prepared for example in an analogous manner to the methods described in German Patents No. 152,012 and No. 154,556. Or they may be prepared by starting from nitro-aryl-glycines which are acylated and reduced.

The new dyestuffs yield on animal fibers brown shades of good fastness properties. They are distinguished from similar brown dyestuffs by a very good solubility and partly by a much better fastness to ironing.

The following examples illustrate, but do not limit the invention, the parts being by weight.

Example 1

20.8 parts of N-(4-aminophenyl)-N-acetyl-amino-acetic acid are diazotized in the usual manner and the diazo solution obtained is combined with 35 parts of 2-(4'-methoxyphenylamino)-8-naphthol-6-sulfonic acid in the presence of an excess of sodium carbonate. The dyestuff formed of the formula:

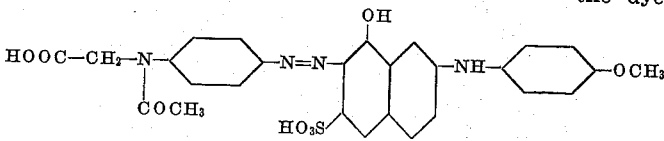

is isolated by the addition of an acid and of sodium chloride. It forms when dry a dark powder, very easily soluble in water, dyeing wool deep full brown shades of good fastness to ironing and light and of good levelling power.

When the combination is performed in the presence of another acid-binding agent such as for example sodium bicarbonate dyestuffs are obtained which yield somewhat more reddish brown shades of similar properties.

Instead of the above diazo component there may be used in an analogous manner other similar compounds such as for example:

N-(4-aminophenyl)-N-methoxyacetyl-aminoacetic acid, N-(4-aminophenyl)-N-carbethoxy-aminoacetic acid, N-(4-aminophenyl)-N-chloroacetyl-aminoacetic acid, N-(4-aminophenyl)-N-phenoxyacetyl-aminoacetic acid, N-(-4-aminophenyl)-N-benzoyl-aminoacetic acid, N-(4-aminophenyl)-N-hexahydrobenzoyl-aminoacetic acid, N-(4-aminophenyl)-N-propionyl-aminoacetic acid, N-(4-amino-2-methylphenyl)-N-acetyl-aminoacetic acid or substituted derivatives thereof. By employing the corresponding amounts of these diazo components instead of the above said N-(4-aminophenyl)-N-acetyl-aminoacetic acid brown dyestuffs are obtained of quite analogous properties and partly distinguished by an increased fastness to light or by deeper brown shades. Thus the dyestuff prepared by starting from N-(4-aminophenyl)-N-benzoyl-aminoacetic acid yields deeper brown shades than the dyestuff prepared by starting from N-(4-aminophenyl)-N-acetyl-aminoacetic acid.

Example 2

20.8 parts of N-(4-aminophenyl)-N-acetylaminoacetic acid are diazotized in the usual manner and the diazo solution obtained is combined with 35 parts of 2-(4'-methoxy-phenylamino)-8-naphthol-6-sulfonic acid in the presence of an excess of sodium acetate. The dyestuff formed is isolated and dried. It forms a dark powder, easily soluble in water, dyeing wool deep violet-tinged brown shades of quite similar properties as the dyestuff obtained according to Example 1, but of a somewhat increased fastness to light.

The difference between the new product and the dyestuff obtained according to Example 1 seems to be caused by the fact that a little amount of another dyestuff is produced beside the dyestuff the formula of which is given in Example 1, whereby the combination probably takes place in the 1-position of the coupling component. When the amount of the sodium acetate employed is varied, more or less of the byproduct is formed and the properties of the dyestuff obtained may be altered thereby.

Instead of the above coupling component there may also be employed in the foregoing examples 2-arylamino-8-naphthol-6-sulfonic acids which may contain further substituents in their aryl radicle. Such coupling components are for example:

2-phenylamino-8-naphthol-6-sulfonic acid, 2-(2'-methyl-phenylamino)-8-naphthol-6-sulfonic acid, 2-(2'-methoxy-phenylamino)-8-naphthol-6-sulfonic acid, 2-(2',4'-dimethoxy-phenylamino)-8-naphthol-6-sulfonic acid, 2-(2',5'-dimethoxy-phenylamino)-8-naphthol-6-sulfonic acid, 2-(chloro-phenylamino)-8-naphthol-6-sulfonic acids, 2-(sulfo-phenylamino)-8-naphthol-6-sulfonic acids, 2-(carboxy-phenylamino)-8-naphthol-6-sulfonic acids.

*Example 3*

19.4 parts of N-(4-aminophenyl)-N-formyl-aminoacetic acid are diazotized in the usual manner and the diazo solution obtained is allowed to run into a solution of 35 parts of 2-(4'-methoxy-phenylamino)-8-naphthol-6-sulfonic acid containing an excess of sodium bicarbonate. When the combination is complete the dyestuff formed substantially consisting of a product of the formula:

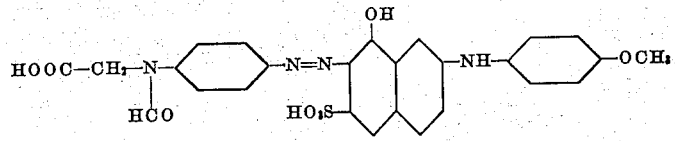

is isolated by the addition of an acid and of sodium chloride. It is when dry a dark powder, soluble in water, dyeing wool and silk very deep brown shades of good fastness to ironing and of good levelling power.

I claim:
1. The monoazo dyestuffs consisting substantially of products of the general formula:

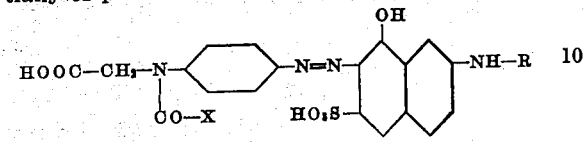

wherein X stands for a member selected from the group consisting of hydrogen, alkyl, alkoxy, cyclohexyl and phenyl and R stands for a monocyclic radicle of the benzene series, which dyestuffs are easily soluble in water and yield on animal fibers brown shades of good fastness properties.

2. A monoazo dyestuff consisting substantially of a product of the formula:

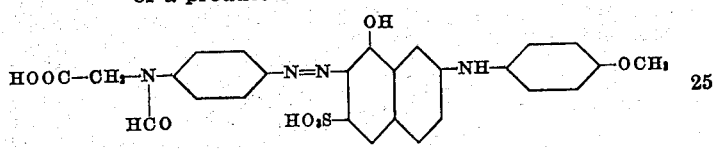

which dyestuff represents a dark powder, soluble in water, dyeing wool and silk very deep brown shades of good fastness to ironing and of good levelling power.

3. A monoazo dyestuff consisting substantially of a product of the formula:

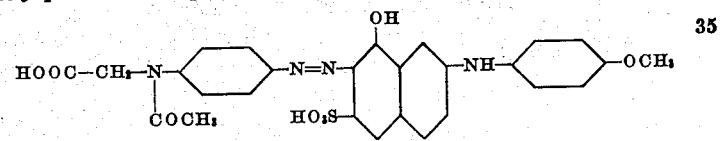

which dyestuff represents a dark powder, very easily soluble in water, dyeing wool deep full brown shades of good fastness to light and ironing and of good levelling power.

RICHARD FLEISCHHAUER.